(12) United States Patent
Lin et al.

(10) Patent No.: US 11,754,329 B2
(45) Date of Patent: Sep. 12, 2023

(54) COOLING SYSTEM

(71) Applicant: INDUSTRIAL TECHNOLOGY RESEARCH INSTITUTE, Hsinchu (TW)

(72) Inventors: Szu-Chia Lin, Yilan (TW); Shih-Jie Wei, Taichung (TW); Ren-Hao Lu, Taichung (TW); Yu-Hsuan Wu, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 237 days.

(21) Appl. No.: 17/230,842

(22) Filed: Apr. 14, 2021

(65) Prior Publication Data

US 2022/0235985 A1  Jul. 28, 2022

(30) Foreign Application Priority Data

Jan. 22, 2021  (TW) .................................. 110102483

(51) Int. Cl.
*F25B 49/02* (2006.01)
*F25D 17/06* (2006.01)
*F25B 13/00* (2006.01)

(52) U.S. Cl.
CPC ............ *F25B 49/022* (2013.01); *F25B 13/00* (2013.01); *F25D 17/06* (2013.01)

(58) Field of Classification Search
CPC ...... F25B 49/022; F25B 13/00; B23Q 11/141; B23Q 11/126
See application file for complete search history.

(56) References Cited

U.S. PATENT DOCUMENTS 5,088,299 A   2/1992  Peterson
6,182,467 B1  12/2001 Zhong et al.
(Continued)

FOREIGN PATENT DOCUMENTS

CN  201452041 U   5/2010
CN  105033073 A  11/2015
(Continued)

OTHER PUBLICATIONS

CN-205156452-U translation.*
(Continued)

*Primary Examiner* — Elizabeth J Martin
(74) *Attorney, Agent, or Firm* — Maschoff Brennan

(57) ABSTRACT

A cooling system for cooling a machine tool having a machine temperature. The cooling system comprises gas source, refrigeration circulation, fan, and controller. The gas source is configured for providing gas. The refrigeration circulation comprises heat exchanger, compressor, condenser, and expansion valve. The heat exchanger is in fluid communication with the gas source and configured to cool the gas down to target temperature and to provide the gas to the machine tool. The compressor has operation frequency. The fan is configured to cool the condenser and has a rotation speed. The controller is connected to the compressor and the fan. When a target temperature difference that is equal to the machine temperature minus the target temperature is smaller than threshold temperature difference, the controller keeps the operation frequency at minimum frequency and sets the rotation speed to be smaller than a maximum rotation speed.

14 Claims, 2 Drawing Sheets

(56) References Cited

U.S. PATENT DOCUMENTS

| | | |
|---|---|---|
| 9,133,927 B2 | 9/2015 | Järvinen et al. |
| 10,457,135 B2 | 10/2019 | Tang et al. |
| 2008/0295540 A1 | 12/2008 | Kunz et al. |
| 2010/0018807 A1 | 1/2010 | Grenfeldt et al. |
| 2012/0241258 A1 | 9/2012 | Subramaniam et al. |
| 2015/0290758 A1 | 10/2015 | Liang |
| 2018/0045294 A1 | 2/2018 | Hori et al. |

FOREIGN PATENT DOCUMENTS

| | | | |
|---|---|---|---|
| CN | 105042914 A | | 11/2015 |
| CN | 105276153 A | | 1/2016 |
| CN | 205156452 U | * | 4/2016 |
| CN | 110686070 A | | 1/2020 |
| CN | 107725743 B | | 5/2020 |
| JP | 2007162884 A | | 6/2007 |
| TW | 201016379 A | | 5/2010 |
| TW | I564500 B | | 1/2017 |
| TW | M591639 U | | 3/2020 |

OTHER PUBLICATIONS

TW Office Action in Application No. 110102483 dated Apr. 8, 2022.

Liu et al., "Effects of lubrication on gear performance: A review" Mechanism and Machine Theory, Nov. 28, 2019.

Wang et al., "Influence of oil injection methods on the lubrication process of high speed spur gears" Tribology International, Feb. 5, 2018.

Fatourehchi et al., "Thermal analysis of an oil jet-dry sump transmission gear under mixedelastohydrodynamic conditions" (ASME) American Society of Mechanical Engineers, Apr. 26, 2018.

Wu et al., "Flow and Heat Transfer in Jet Cooling Rolling Bearing Gear Lubrication and Cooling Experiment and Analysis" IntechOpen, Jan. 24, 2019.

\* cited by examiner

COOLING SYSTEM

CROSS-REFERENCE TO RELATED APPLICATIONS

This non-provisional application claims priority under 35 U.S.C. § 119(a) on Patent Application No(s). 110102483 filed in Taiwan (R.O.C.) on Jan. 22, 2021, the entire contents of which are hereby incorporated by reference.

TECHNICAL FIELD

The disclosure relates to a cooling system, more particularly to a cooling system that can offer a gas of stable temperature.

BACKGROUND

In the field of machine tool, metal or other rigid materials can be machined by cutting, boring, grinding, shearing, or other forms of deformation. Using cutting tool at high rotational speed. Generally, machine tools employ some sort of tool that does the cutting or sharping to a workpiece. Regarding the boring or drilling machine tool, their cutting tools can be rotated at an extremely high speed, thus unwanted material can be removed from the workpiece during the relative movement between the workpiece and the cutting tool. However, during the machining process, high temperature often appears at the rotating shaft that rotates the cutting tool or the workpiece. This may lead to thermal expansion of the shaft or other material around, affecting the machining accuracy.

Thus, a refrigeration circulation is used to cool down the shaft of the machine tool. In the typical refrigeration circulation, the cooling capability is adjusted by regulating the frequency of the compressor, and the shaft or other high-temperature materials can be cooled using cooled fluid. When the cooling requirement is lowered, the frequency of the compressor is decreased as well. When the frequency of the compressor is decreased to the minimum frequency, the compressor is turned off but only will be turned on as long as there is a cooling requirement again.

This type of operation results in repeatedly turning on and off the compressor, thus the temperature of the cooled fluid is unstable. As a result, the shaft temperature of the machine tool becomes unstable, affecting the machining accuracy.

SUMMARY

Accordingly, the present disclosure provides a cooling system that can avoid repeatedly turning on and off the compressor so as to offer cooling gas of stable temperature to machine tool and therefore improve the machining accuracy.

One embodiment of the disclosure provides a cooling system configured for cooling a machine tool. The machine tool has a machine temperature. The cooling system comprises a gas source, a refrigeration circulation, a fan, and a controller. The gas source is configured for providing a gas. The refrigeration circulation comprises a heat exchanger, a compressor, a condenser, and an expansion valve. The heat exchanger is in fluid communication with the gas source and is configured to cool the gas down to a target temperature and to provide the gas to the machine tool. The compressor has an operation frequency. The fan is configured to cool the condenser and has a rotation speed. The controller is connected to the compressor and the fan. When a target temperature difference that is equal to the machine temperature minus the target temperature is smaller than a threshold temperature difference, the controller keeps the operation frequency at a minimum frequency and sets the rotation speed to be smaller than a maximum rotation speed.

According to the cooling system as discussed in the above embodiments of the disclosure, when the target temperature difference is smaller than the threshold temperature difference, the operation frequency of the compressor is maintained at the minimum frequency and the rotation speed of the fan is set to be smaller than the maximum rotation speed, such that the compressor is able to continuously operate without being turned off. Also, the reduction of the rotation speed of the fan can make the cooling system more applicable to smaller target temperature difference. Therefore, the cooled gas will have a stable temperature, and the temperature of the machine tool will be stable as well, improving the machining accuracy.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

Figure 1:
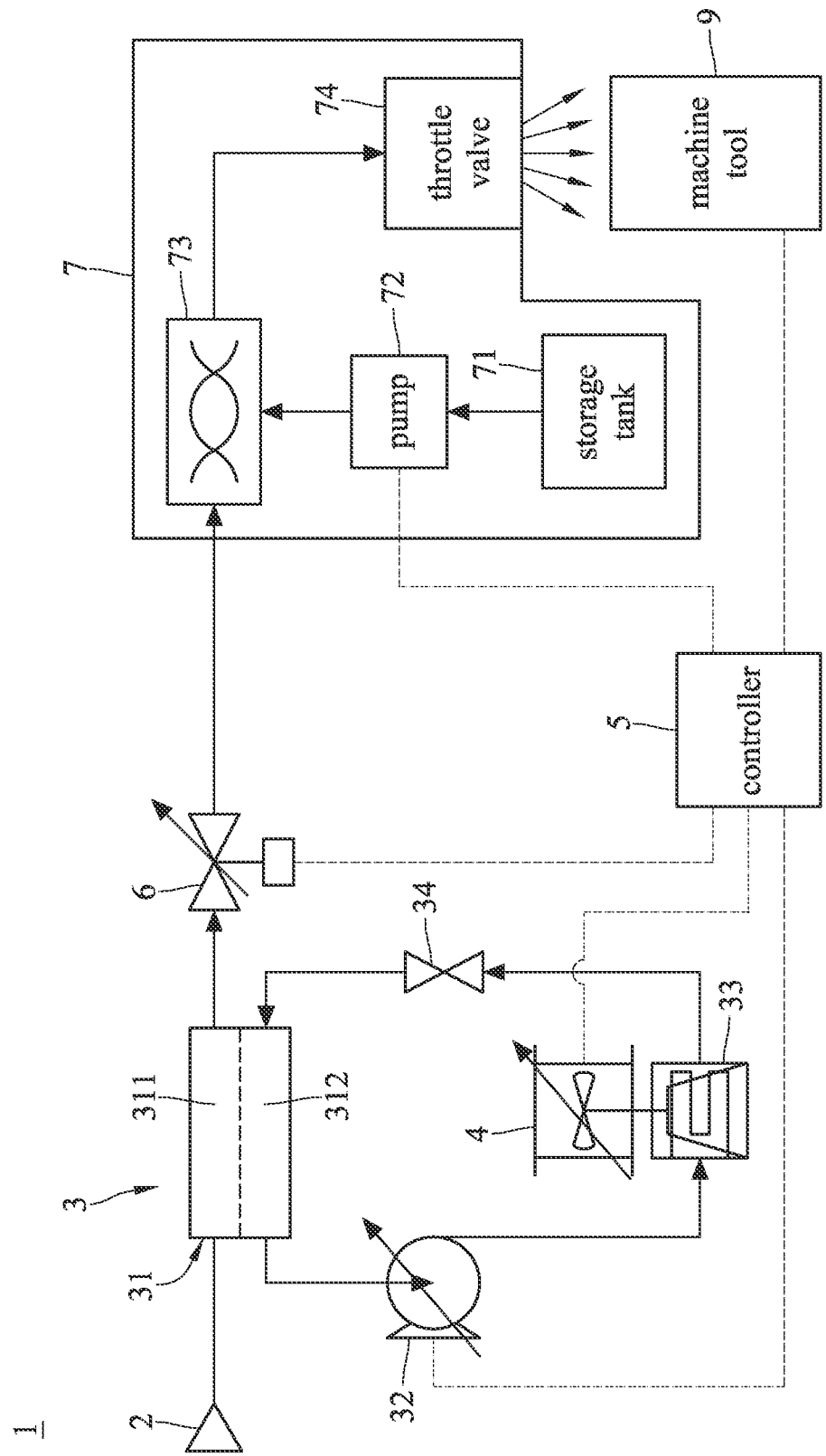
FIG. 1 is a block diagram of a cooling system according to one embodiment of the disclosure.

Referring to FIG. 1, there is shown a block diagram of a cooling system according to one embodiment of the disclosure.

The cooling system 1 is able to cool down a machine tool 9, where the machine tool 9 has a machine temperature $T_m$. In this embodiment, the cooling system 1 includes a gas source 2, a refrigeration circulation 3, a fan 4, a controller 5, a pressure regulator valve 6 and a supplying module 7, but the disclosure is not limited thereto. The cooling system in another embodiment may omit the pressure regulator valve 6.

In this embodiment, the gas source 2 is provided to offer a gas (e.g., air). The refrigeration circulation 3 includes a heat exchanger 31, a compressor 32, a condenser 33, and an expansion valve 34. A suitable coolant is flowing in the refrigeration circulation 3. The compressor 32 has an operation frequency $F_c$ during operation. The fan 4 is to help move unwanted heat away from the condenser 33. The fan 4 has a rotation speed $R_f$ during operation.

In this embodiment, the heat exchanger 31 has a first pipe 311 and a second pipe 312 that are in thermal contact with each other. The first pipe 311 is in fluid communication with the gas source 2 so as to cool the gas down to a target temperature $T_a$. The second pipe 312 is in fluid communication with the compressor 32 and the expansion valve 34, where the coolant flows through the second pipe 312.

In this embodiment, the controller 5 is electrically connected to the compressor 32 and the fan 4. The controller 5 is able to control the operation frequency $F_c$ of the compressor 32 and the rotation speed $R_f$ of the fan 4.

In this embodiment, the pressure regulator valve 6 is connected to the first pipe 311 of the heat exchanger 31. The controller 5 is connected to the pressure regulator valve 6. The controller 5 is able to control the pressure regulator valve 6 in order to regulate the pressure of the gas to a target pressure $P_t$. The first pipe 311 is able to provide the cooled gas to the pressure regulator valve 6 and the supplying module 7 so as to offer it to the machine tool 9, but the disclosure is not limited thereto. In other embodiments, the heat exchanger 31 may directly provide the cooled gas to the machine tool 9.

In this embodiment, the supplying module 7 includes a storage tank 71, a pump 72, a mixing valve 73, and a throttle valve 74. The storage tank 71 is configured to store a lubricating fluid. The pump 72 is connected to the storage tank 71. The pump 72 is to pump the lubricating fluid out of the storage tank 71. The mixing valve 73 is connected to the first pipe 311 of the heat exchanger 31 via the pressure regulator valve 6. In addition, the mixing valve 73 is connected to the pump 72. The throttle valve 74 is connected to the mixing valve 73. The controller 5 is electrically connected to the pump 72 so as to control the pump 72, such that the lubricating fluid can be provided to the mixing valve 73 at specific time interval I. The mixing valve 73 is al be to mix the gas coming from the heat exchanger 31 and the lubricating fluid coming from the pump 72. The throttle valve 74 is able to provide the machine tool 9 with the mixture of the gas and the lubricating fluid. In this embodiment, the mixing valve 73 is connected to the heat exchanger 31 via the pressure regulator valve 6, but the disclosure is not limited thereto. In other embodiments, the mixing valve 73 may be directly connected to the heat exchanger 31.

Figure 2:
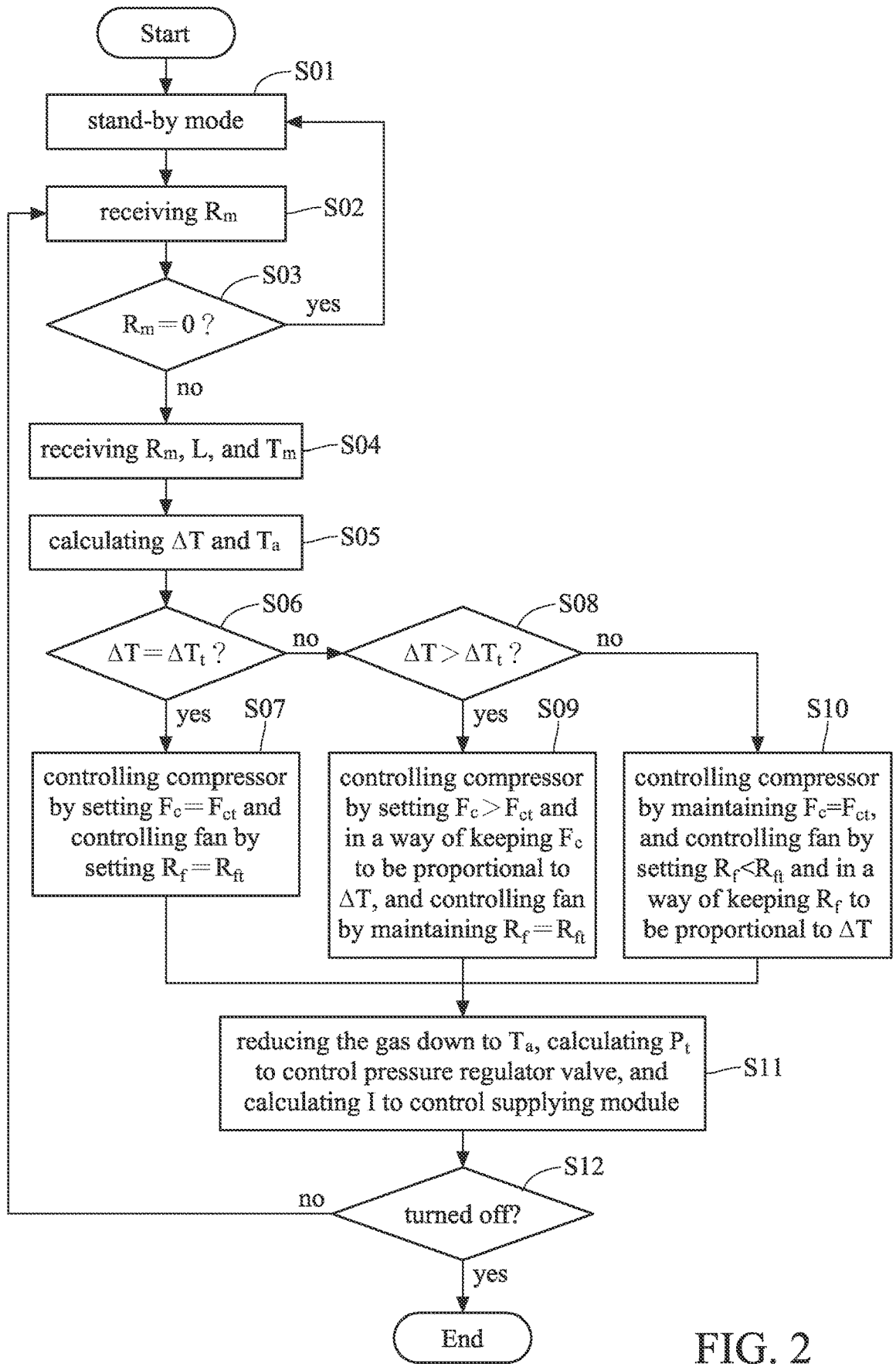
FIG. 2 is a flow chart showing the operation of the cooling system in FIG. 1.

Referring to FIGS. 1 and 2, there is shown a flow chart of the operation of the cooling system 1. The operation of the cooling system 1 may contain the following steps:

In step S01, the cooling system 1 is in stand-by mode. In this mode, the compressor 32 of the refrigeration circulation 3 and the fan 4 were turned off by the controller 5. In addition, by the controller 5, the target pressure $P_t$ is set at a predetermined minimum value using the pressure regulator valve 6. Also, the controller 5 sets the specific time interval I to a predetermined maximum value for the later process of pumping the lubricating fluid out of the storage tank 71 and offering it to the mixing valve 73. The cooled gas and the lubricating fluid is mixed by the mixing valve 73. The throttle valve 74, as discussed above, is able to offer the mixture of the gas and the lubricating fluid to the machine tool 9. In one embodiment, the predetermined minimum value of the target pressure $P_t$ may be 1.5 bar, and the predetermined maximum value of the specific time interval I may be 180 seconds.

Then, in step S02, the machine tool 9 outputs a signal related to shaft rotation speed $R_m$. The controller 5 receives the signal of the shaft rotation speed $R_m$.

Then, in step S03, the controller 5 determines whether the shaft rotation speed $R_m$ is zero (i.e., determining whether $R_m=0$). When the controller 5 determines that the shaft rotation speed $R_m$ is zero (i.e., $R_m=0$), the operation goes back to step S01. This result means that the machine tool 9 is not in operation, and the cooling system 1 is still in stand-by mode. On the other hand, when the controller 5 determines that the shaft rotation speed $R_m$ is not zero (i.e., $R_m\neq0$), then step S04 is performed. Note that the value of the rotation speed is always in positive value, thus when $R_m\neq0$, meaning $R_m>0$.

In step S04, the machine tool 9 outputs signals related to the shaft rotation speed $R_m$, shaft load L, and the machine temperature $T_m$. When the controller 5 determines that the shaft rotation speed $R_m$ is not zero (i.e., $R_m>0$), the controller 5 receives the signals of the shaft load L and the machine temperature $T_m$ of the machine tool 9. In this embodiment, the controller 5 is able to repeatedly receive the signal of the shaft rotation speed $R_m$ so as to timely detect the condition of the machine tool 9, but the disclosure is not limited thereto. In other embodiments, the controller 5 may not repeatedly receive the signal of the shaft rotation speed $R_m$.

Then, in step S05, the controller 5 calculates target temperature difference $\Delta T$ and target temperature $T_a$ according to the signal of the shaft rotation speed $R_m$, the shaft load L, and the machine temperature $T_m$. The shaft rotation speed $R_m$ is positively proportional to the target temperature difference $\Delta T$. The shaft load L is positively proportional to the target temperature difference $\Delta T$. In specific, the target temperature difference $\Delta T$ satisfies the following relations: $\Delta T=aR_m^2+bR_m+cR_mL$, wherein $\Delta T$ denotes the target temperature difference, a, b, c denote positive coefficients, $R_m$ denotes the shaft rotation speed, L denotes the shaft load. In addition, the target temperature difference $\Delta T$ is equal to the machine temperature $T_m$ minus the target temperature $T_a$. That is, $T_a=T_m-\Delta T$. In one embodiment, $a=4\times10^{-8}$, $b=2\times10^{-8}$, $c=5\times10^{-8}$. The target temperature difference $\Delta T$, machine temperature $T_m$ and the target temperature $T_a$ are measured in degrees Celsius (° C.). The shaft rotation speed $R_m$ is measured in RPM (revolutions per minute). The shaft load L (%) is equal to the current output power of the machine tool 9 divided by predetermined maximum output power.

Then, in step S06, the controller 5 determines whether the target temperature difference $\Delta T$ is equal to a threshold temperature difference $\Delta T_t$ (i.e., determining whether $\Delta T=\Delta T_t$). When the controller 5 determines that the target temperature difference $\Delta T$ is equal to the threshold temperature difference $\Delta T_t$ (i.e., $\Delta T=\Delta T_t$), then step S07 is performed. On the other hand, when the controller 5 determines that the target temperature difference $\Delta T$ is not equal to the threshold temperature difference $\Delta T_t$ (i.e., $\Delta T\neq\Delta T_t$), then step S08 is performed.

In step S07, the target temperature difference $\Delta T$ is equal to the threshold temperature difference $\Delta T_t$ (i.e., $\Delta T=\Delta T_t$), the controller 5 sets the operation frequency $F_c$ of the compressor 32 at the minimum frequency $F_a$ (i.e., controlling the compressor 32 by setting $F_c=F_{ct}$), and the controller 5 sets the rotation speed $R_f$ of the fan 4 at maximum rotation speed $R_{ft}$ (i.e., controlling the fan 4 by setting $R_f=R_{ft}$). In one embodiment, the minimum frequency $F_{ct}$ may be 35 Hz (i.e., $F_{ct}=35$ Hz), but the disclosure is not limited thereto. In other embodiments, the minimum frequency $F_{ct}$ may be adjusted according to the type of the compressor 32.

In step S08, the target temperature difference $\Delta T$ is not equal to the threshold temperature difference $\Delta T_t$ (i.e., $\Delta T\neq\Delta T_t$), the controller 5 determines whether the target temperature difference $\Delta T$ is greater than the threshold temperature difference $\Delta T_t$ (i.e., determining whether $\Delta T>\Delta T_t$). When the controller 5 determines that the target temperature difference $\Delta T$ is greater than the threshold temperature difference $\Delta T_t$ (i.e., $\Delta T>\Delta T_t$), then step S09 is performed. On the other hand, when the controller determines that the target temperature difference $\Delta T$ is neither greater than nor equal to the threshold temperature difference $\Delta T_t$ (i.e., $\Delta T<\Delta T_t$), then step S10 is performed.

In step S09, the target temperature difference $\Delta T$ is greater than the threshold temperature difference $\Delta T_t$ (i.e., $\Delta T>\Delta T_t$), the controller 5 sets the operation frequency $F_c$ of the compressor 32 to be larger than the minimum frequency $F_a$ (i.e., controlling the compressor 32 by setting $F_c > F_{ct}$), and sets the rotation speed $R_f$ of the fan 4 at the maximum rotation speed $R_{ft}$ (i.e., controlling the fan 4 by maintaining $R_f = R_{ft}$). The operation frequency $F_c$ is positively proportional to the target temperature difference $\Delta T$ (i.e., controlling the compressor in a way of keeping the operation frequency $F_c$ to be proportional to the target temperature difference $\Delta T$).

In step S10, the target temperature difference $\Delta T$ is smaller than the threshold temperature difference $\Delta T_t$ (i.e., $\Delta T < \Delta T_t$), the controller 5 sets the operation frequency $F_c$ of the compressor 32 at the minimum frequency $F_a$ (i.e., controlling the compressor 32 by maintaining $F_c = F_{ct}$), and sets the rotation speed $R_f$ of the fan 4 to be smaller than the maximum rotation speed $R_{ft}$ (i.e., controlling the fan 4 by setting $R_f < R_{ft}$). The rotation speed $R_f$ is positively proportional to the target temperature difference $\Delta T$ (i.e., controlling the fan 4 in a way of keeping the rotation speed $R_f$ to be proportional to the target temperature difference $\Delta T$). By doing so, when the target temperature difference $\Delta T$ is smaller than the threshold temperature difference $\Delta T_t$, the compressor 32 is able to continuously operate without being turned off; that is, there is no need to repeatedly turn on and off the compressor 32. Accordingly, the coolant flowing through the second pipe 312 of the heat exchanger 31 will have a stable temperature.

Step S11 is performed after steps S07, S09 or S10. In step S11, the heat exchanger 31 cools the gas coming from the gas source 2. In specific, the coolant flowing through the second pipe 312 of the heat exchanger 31 is able to absorb heat contained in the first pipe 311 of the heat exchanger 31. This can reduce the temperature of the gas down to the target temperature $T_a$. Due to the stability of the coolant flowing over the second pipe 312, the coolant is able to stably cool the gas within the first pipe 311, such that the cooled gas will have a stable temperature as well.

Also, the controller 5 calculates the target pressure $P_t$ according to the shaft rotation speed $R_m$ and the shaft load L. The shaft rotation speed $R_m$ is positively proportional to the target pressure $P_t$. The shaft load L is positively proportional to the target pressure $P_t$. The target pressure $P_t$ satisfies the following relation: $P_t = dR_m^2 + eR_m + fL + g$, where $P_t$ denotes target pressure, d, e, f, g denote positive coefficients. In one embodiment, $d=3\times10^{-9}$, $e=1\times10^{-5}$, $f=0.005$, $g=1.5$. The target pressure $P_t$ is measured in bar. The shaft rotation speed $R_m$ is measured in RPM. The shaft load L (%) is equal to the current output power of the machine tool 9 divided by predetermined maximum output power. The controller 5 controls the pressure regulator valve 6 to set the pressure of the gas to be the target pressure $P_t$. In one embodiment, 1.5 bar $\leq P_t \leq$ 4.0 bar.

Further, the controller 5 calculates the specific time interval I according to the shaft rotation speed $R_m$ and the shaft load L. The shaft rotation speed $R_m$ is positively proportional to the specific time interval I, while the shaft load L is negatively proportional to the specific time interval I. The specific time interval I satisfies the following relation: $I = hR_m^2 + iR_m - jL + k$, where I denotes specific time interval, h, i, j, k denote positive coefficients. In one embodiment, $h=1\times10^{-7}$, $i=6\times10^{-4}$, $j=0.4$, $k=100$. The specific time interval I is measured in second. The shaft rotation speed $R_m$ is measured in RPM. The shaft load L (%) is equal to the current output power of the machine tool 9 divided by predetermined maximum output power. The controller 5 controls the supplying module 7 so as to supply the mixture of the gas and the lubricating fluid to the machine tool 9 at specific time interval I. In specific, the controller 5 controls the pump 72 so as to provide the lubricating fluid to the mixing valve 73 at the specific time interval I, the mixing valve 73 mixes the cooled gas and the lubricating fluid, and then the throttle valve 74 offers the mixture of the gas and the lubricating fluid to the machine tool 9. Due to the stability of the cooled gas, the mixture of the gas and the lubricating fluid will have a stable temperature as well, making the temperature of the machine tool 9 stable and helping improve the machining accuracy 9.

In this embodiment, the controller 5 calculates the target pressure $P_t$ and the specific time interval I during step S11, but the disclosure is not limited thereto. In other embodiments, the controller 5 may calculate the target pressure $P_t$ and the specific time interval I during any one of the steps from S05-S10.

Lastly, step S12 is performed after step S11, in step S12, the controller 5 determines whether the cooling system 1 is turned off. When the controller 5 determines that the cooling system 1 is turned off, the operation of the cooling system 1 is stopped. On the other hand, when the controller 5 determines that the cooling system 1 is still on, then the operation goes back to step S02.

According to the cooling system as discussed in the above embodiments of the disclosure, when the target temperature difference is smaller than the threshold temperature difference, the operation frequency of the compressor is maintained at the minimum frequency and the rotation speed of the fan is set to be smaller than the maximum rotation speed, such that the compressor is able to continuously operate without being turned off. Also, the reduction of the rotation speed of the fan can make the cooling system more applicable to smaller target temperature difference. Therefore, the cooled gas will have a stable temperature, and the temperature of the machine tool will be stable as well, improving the machining accuracy.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A cooling system, configured for cooling a machine tool, the machine tool having a machine temperature, the cooling system comprising:
   a gas source, configured for providing a gas;
   a refrigeration circulation, comprising a heat exchanger, a compressor, a condenser, and an expansion valve, wherein the heat exchanger is in fluid communication with the gas source and is configured to cool the gas down to a target temperature and to provide the gas to the machine tool, and the compressor has an operation frequency;
   a fan, configured to cool the condenser, wherein the fan has a rotation speed;
   a controller, connected to the compressor and the fan; and
   a supplying module, connected to the heat exchanger, wherein the supplying module is configured to supply the gas and a lubricating fluid to the machine tool;
   wherein when a target temperature difference that is equal to the machine temperature minus the target temperature is smaller than a threshold temperature difference, the controller keeps the operation frequency at a minimum frequency and sets the rotation speed to be smaller than a maximum rotation speed, the controller is connected to the supplying module, the controller is configured control the supplying module to supply the gas and a lubricating fluid to the machine tool at a specific time interval.

2. The cooling system according to claim 1, wherein the machine tool has a shaft rotation speed and a shaft load, the controller calculates the specific time interval according to the shaft rotation speed and the shaft load, the shaft rotation speed is positively proportional to the specific time interval, and the shaft load is negatively proportional to the specific time interval.

3. The cooling system according to claim 2, wherein the specific time interval satisfies the following relation:
$I=hR_m^2+iR_m-jL+k$, where I denotes the specific time interval, h, i, j, and k denote positive coefficients, $R_m$ denotes the shaft rotation speed, and L denotes the shaft load.

4. The cooling system according to claim 1, wherein the supplying module comprises:
a storage tank, configured to store the lubricating fluid;
a pump, in fluid communication with the storage tank and configured to pump the lubricating fluid out of the storage tank;
a mixing valve, connected to the heat exchanger and the pump and configured to mix the gas and the lubricating fluid; and
a throttle valve, connected to the mixing valve and configured to provide a mixture of the gas and the lubricating fluid to the machine tool.

5. The cooling system according to claim 4, wherein the controller is connected to the pump so as to control the pump to pump the lubricating fluid to the mixing valve at a specific time interval.

6. The cooling system according to claim 1, wherein when the target temperature difference is smaller than the threshold temperature difference, the rotation speed is positively proportional to the target temperature difference.

7. The cooling system according to claim 1, wherein when the target temperature difference is greater than the threshold temperature difference, the controller sets the operation frequency to be greater than the minimum frequency and keeps the rotation speed at the maximum rotation speed, when the target temperature difference is equal to the threshold temperature difference, the controller keeps the operation frequency at the minimum frequency and keeps the rotation speed at the maximum rotation speed.

8. The cooling system according to claim 7, wherein when the target temperature difference is greater than the threshold temperature difference, the operation frequency is positively proportional to the target temperature difference.

9. The cooling system according to claim 1, wherein the machine tool has a shaft rotation speed and a shaft load, the controller calculates the target temperature difference according to the shaft rotation speed and the shaft load, the shaft rotation speed is positively proportional to the target temperature difference, and the shaft load is positively proportional to the target temperature difference.

10. The cooling system according to claim 9, wherein the target temperature difference satisfies the following relation:
$\Delta T=aR_m^2+bR_m+cR_mL$, where $\Delta T$ denotes the target temperature difference, a, b, c denote positive coefficients, $R_m$ denotes the shaft rotation speed, and L denotes the shaft load.

11. The cooling system according to claim 1, wherein the heat exchanger has a first pipe and a second pipe which are in thermal contact with each other, the first pipe is in fluid communication with the gas source and is configured to provide the gas to the machine tool, and the second pipe is connected to the compressor and the expansion valve.

12. The cooling system according to claim 1, further comprising a pressure regulator valve connected to the heat exchanger, wherein the pressure regulator valve is configured to adjust a pressure of the gas to a target pressure.

13. The cooling system according to claim 12, wherein the machine tool has a shaft rotation speed and a shaft load, the controller is connected to the pressure regulator valve, the controller calculates the target pressure according to the shaft rotation speed and the shaft load and controls the pressure regulator valve, the shaft rotation speed is positively proportional to the target pressure, and the shaft load is positively proportional to the target pressure.

14. The cooling system according to claim 13, wherein the target pressure satisfies the following relation:
$P_t=dR_m^2+eR_m+fL+g$, where $P_t$ denotes the target pressure, d, e, f, g denote positive coefficients, $R_m$ denotes the shaft rotation speed, and L denotes the shaft load.

* * * * *